(12) United States Patent
Labbe

(10) Patent No.: US 10,753,219 B2
(45) Date of Patent: Aug. 25, 2020

(54) INTERNALLY COOLED SEAL RUNNER AND METHOD OF COOLING SEAL RUNNER OF A GAS TURBINE ENGINE

(71) Applicant: PRATT & WHITNEY CANADA CORP., Longueuil (CA)

(72) Inventor: Michel Labbe, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 179 days.

(21) Appl. No.: 14/746,246

(22) Filed: Jun. 22, 2015

(65) Prior Publication Data

US 2016/0348792 A1 Dec. 1, 2016

Related U.S. Application Data

(60) Provisional application No. 62/166,557, filed on May 26, 2015.

(51) Int. Cl.
| | |
|---|---|
| *F01D 11/00* | (2006.01) |
| *F16J 15/16* | (2006.01) |
| *F01D 25/18* | (2006.01) |
| *F01D 25/12* | (2006.01) |
| *F02C 7/28* | (2006.01) |

(52) U.S. Cl.
CPC ............ *F01D 11/003* (2013.01); *F01D 25/12* (2013.01); *F01D 25/183* (2013.01); *F16J 15/162* (2013.01); *F02C 7/28* (2013.01); *F05D 2240/55* (2013.01)

(58) Field of Classification Search
CPC ........ F01D 11/003; F01D 25/12; F01D 25/18; F01D 25/183; Y10S 277/93; F16J 15/162; F16J 15/3404; F02C 7/28; F05D 2240/55
See application file for complete search history.

(56) References Cited

U.S. PATENT DOCUMENTS

| | | |
|---|---|---|
| 2,598,381 A | 5/1952 | Hoffman |
| 2,857,182 A | 10/1958 | Bain et al. |
| 2,956,824 A | 10/1960 | Kuchler et al. |
| 2,992,842 A | 7/1961 | Shevchenko et al. |
| 3,806,135 A | 4/1974 | Wiese |
| 4,406,459 A | 9/1983 | Davis et al. |
| 4,709,545 A | 12/1987 | Stevens et al. |
| 4,749,199 A | 6/1988 | Gresh |
| 4,858,426 A | 8/1989 | Holcomb |
| 5,039,113 A | 8/1991 | Gardner |
| 5,593,165 A | 1/1997 | Murray et al. |
| 5,813,830 A | 9/1998 | Smith et al. |

(Continued)

*Primary Examiner* — Nicholas L Foster
(74) *Attorney, Agent, or Firm* — Norton Rose Fulbright Canada LLP

(57) ABSTRACT

The seal runner has an annular body secured to a rotating shaft of the gas turbine engine whereas ring segments are secured to a case of the gas turbine, with the seal runner having a radially-outer surface having a contacting portion adapted to rubbingly receive ring segments of the contact seal assembly during use, the seal runner having a radially-inner surface opposite to the radially-outer surface. The method includes rotating the seal runner relative to the ring segments and generating heat from the rubbing engagement therebetween; and feeding a flow of cooling fluid against the radially-inner surface to cool the seal runner from said generated heat including maintaining a pool of cooling fluid having a given depth against the radially-inner surface.

14 Claims, 5 Drawing Sheets

(56) References Cited

U.S. PATENT DOCUMENTS

| | | | |
|---|---|---|---|
| 6,322,081 B1 | 11/2001 | Ullah et al. | |
| 6,409,464 B1 * | 6/2002 | Fisher | F01D 25/16 |
| | | | 384/475 |
| 6,568,688 B1 * | 5/2003 | Boeck | F01D 11/04 |
| | | | 277/411 |
| 7,252,291 B2 | 8/2007 | Khonsari et al. | |
| 7,435,052 B2 | 10/2008 | Spencer et al. | |
| 8,529,135 B2 * | 9/2013 | Duffy | F16C 33/6681 |
| | | | 384/385 |
| 8,678,741 B2 | 3/2014 | Olennikov | |
| 8,845,282 B2 | 9/2014 | LaPierre et al. | |
| 9,133,939 B2 * | 9/2015 | Scothern | F16J 15/42 |
| 9,631,508 B2 * | 4/2017 | Blais | F01D 11/00 |
| 2004/0179935 A1 * | 9/2004 | Maguire | F01D 25/183 |
| | | | 415/111 |
| 2014/0369832 A1 * | 12/2014 | Blais | F01D 11/00 |
| | | | 415/230 |
| 2016/0032771 A1 * | 2/2016 | Vdoviak, Jr. | F02C 7/06 |
| | | | 277/358 |
| 2016/0040544 A1 * | 2/2016 | Desjardins | F01D 25/186 |
| | | | 415/111 |
| 2016/0131034 A1 * | 5/2016 | Chilton | F16N 7/363 |
| | | | 184/6.11 |
| 2016/0348522 A1 * | 12/2016 | Labbe | F01D 11/003 |
| 2016/0348792 A1 * | 12/2016 | Labbe | F01D 11/003 |
| 2017/0016350 A1 * | 1/2017 | Miller | F01D 5/02 |

* cited by examiner ively to each other to form a rubbing, contact
INTERNALLY COOLED SEAL RUNNER AND METHOD OF COOLING SEAL RUNNER OF A GAS TURBINE ENGINE

TECHNICAL FIELD

The invention relates generally to gas turbine engines, and more particularly to seals for rotating components in a gas turbine engine.

BACKGROUND OF THE ART

Contact seals, often made of carbon and hence referred to correctly or incorrectly as carbon seals, are commonly used to provide a fluid seal around a rotating shaft, particularly high speed rotating shafts used in high temperature environments such as in gas turbine engines. Such contact seals usually comprise ring segments and a seal runner which abut and rotate relative to each other to form a rubbing, contact interface which creates a fluid seal around the shaft. Pressurized gas can be used to force the ring segments against the seal runner and create a gas pressure differential with the bearing cavity which repels impinging oil. Typically, but not necessarily, the seal runner is disposed on the rotating shaft and rotates within an outer stationary ring, causing the rubbing interface between the rotating seal runner and the rotationally-stationary ring. Although efforts are made to limit friction, the rubbing contact can generate significant heat during operation, especially in the context of high rotational speeds of gas turbine engine shafts, and means are provided to dissipate this heat. This heat dissipation is most often accomplished using fluid cooling, for example oil from the engine's recirculating oil system which is sprayed onto exposed surfaces of the seal runner and/or the ring.

There always remains room for improvement.

SUMMARY

In one aspect, there is provided a seal runner for use in a contact seal assembly of a gas turbine engine, the seal runner having an annular body securable to a rotating shaft of the gas turbine engine during use whereas ring segments of the contact seal assembly are securable to a case of the gas turbine engine during use, the seal runner having a radially-outer surface having a contacting portion adapted to rubbingly receive ring segments of the contact seal assembly during use, the seal runner having a radially-inner surface opposite to the radially-outer surface, the radially-inner surface extending axially, and a cooling fluid passage having a segment extending along the radially-inner surface of the seal runner and leading axially to an outlet, the outlet having an inlet end receiving the cooling fluid from the cooling fluid passage during use, the inlet end being radially spaced apart from the radially-inner surface of the seal runner by a given spacing distance in a manner to form a pool of cooling fluid having a depth corresponding to the given spacing distance and extending opposite to the contacting portion of the radially-outer surface.

In another aspect, there is provided a gas turbine engine comprising a contact seal assembly having a seal runner having an annular body securable to a rotating shaft of the gas turbine engine during use whereas ring segments of the contact seal assembly are securable to a case of the gas turbine engine during use, the seal runner having a radially-outer surface having a contacting portion adapted to rubbingly receive ring segments of the contact seal assembly during use, the seal runner having a radially-inner surface opposite to the radially-outer surface, the radially-inner surface extending axially, and a cooling fluid passage having a segment extending along the radially-inner surface of the seal runner and leading axially to an outlet, the outlet having an inlet end receiving the cooling fluid from the cooling fluid passage during use, the inlet end being radially spaced apart from the radially-inner surface of the seal runner by a given spacing distance in a manner to form a pool of cooling fluid having a depth corresponding to the given spacing distance and extending opposite to the contacting portion of the radially-outer surface.

In a further aspect, there is provided a method of internally cooling a seal runner of a gas turbine engine, the seal runner having an annular body secured to a rotating shaft of the gas turbine engine whereas ring segments are secured to a case of the gas turbine, with the seal runner having a radially-outer surface having a contacting portion adapted to rubbingly receive ring segments of the contact seal assembly during use, the seal runner having a radially-inner surface opposite to the radially-outer surface, the method comprising: rotating the seal runner relative to the ring segments and generating heat from the rubbing engagement therebetween; and feeding a flow of cooling fluid against the radially-inner surface to cool the seal runner from said generated heat including maintaining a pool of cooling fluid having a given depth against the radially-inner surface.

DESCRIPTION OF THE DRAWINGS

Reference is now made to the accompanying figures in which.

DETAILED DESCRIPTION

Figure 1:
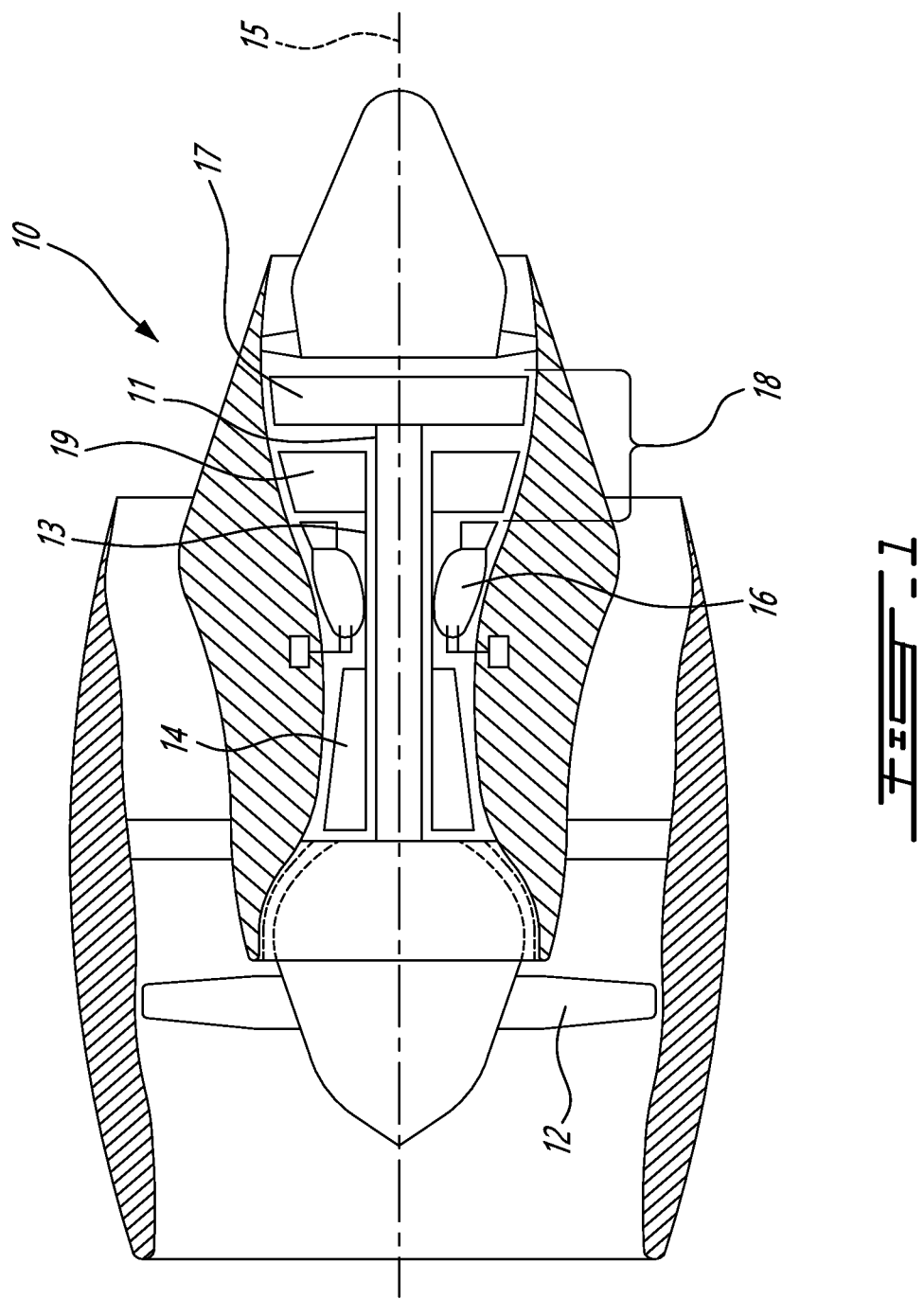
FIG. 1 is a schematic cross-sectional view of a gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

In the depicted embodiment, the turbine section 18 comprises a low pressure turbine 17 and a high pressure turbine 19. The engine 10 also preferably includes at least two rotating main engine shafts, namely a first inner shaft 11 interconnecting the fan 12 with the low pressure turbine 17, and a second outer shaft 13 interconnecting the compressor 14 with the high pressure turbine 19. The inner and outer main engine shafts 11 and 13 are concentric and rotate about the centerline axis 15 which is collinear with their longitudinal axes.

The main engine shafts 11, 13 are supported at a plurality of points by bearings, and extend through several engine cavities. As such, a number of shaft seals are provided to ensure sealing about the shafts at several points along their length to prevent unwanted fluid leaking from one engine compartment or cavity. For example, in some engine configurations, compressed air in the main engine gas passage must be kept separate from the secondary cooling air or bearing lubrication oil in bearing cavities and cooling cavities adjacent to the main engine gas passage.

Figure 2:
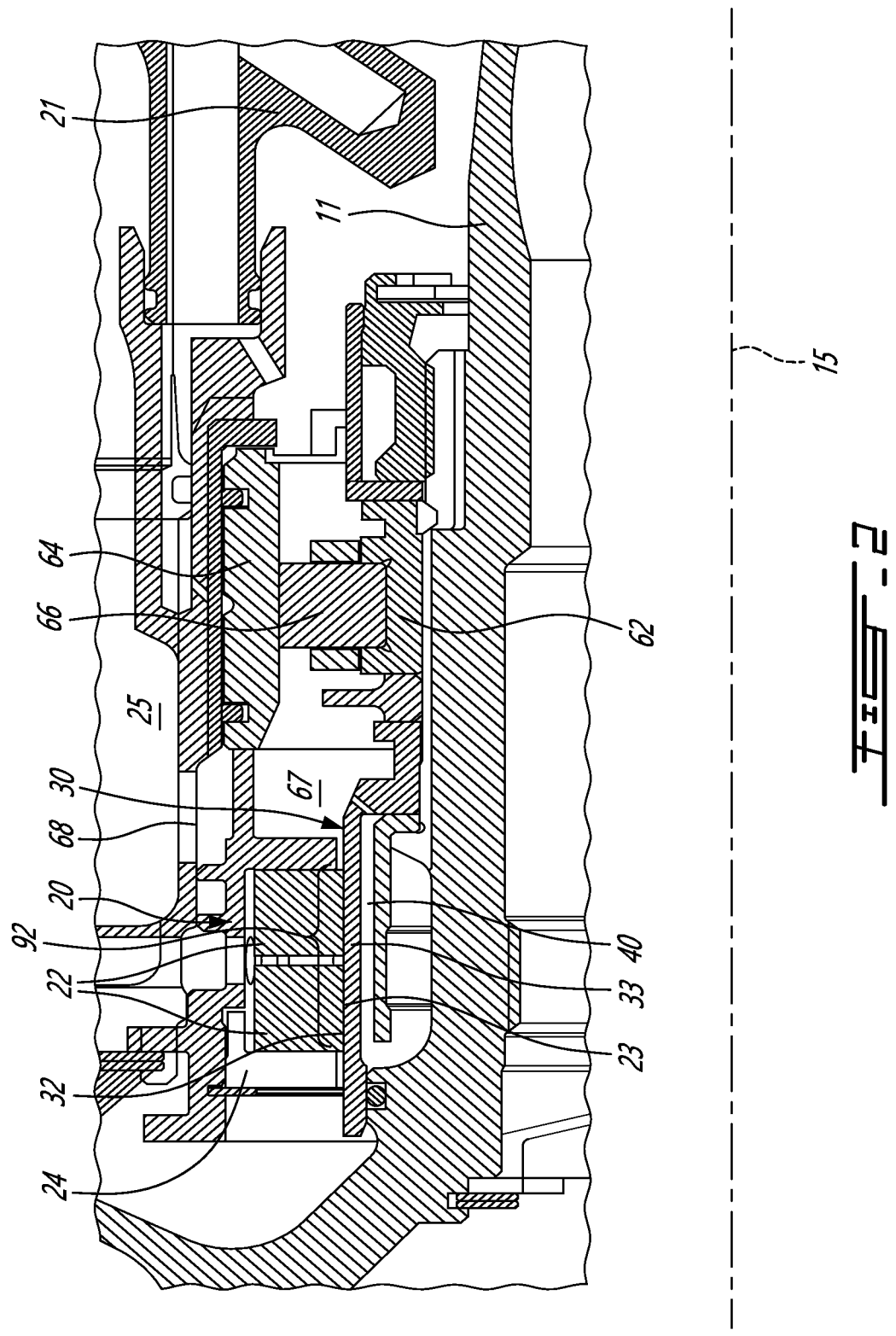
FIG. 2 is a partial cross-sectional view of a bearing and seal assembly.

Referring now to FIG. 2, at least one of the shaft seals used to seal the rotating shaft 11 and/or 13 in the engine 10 is a contact seal 20, as will now be described in further detail.

The contact seal 20 includes generally a number of rotationally stationary ring segments 22 (made of carbon in this embodiment) which together form at least one circumferentially interrupted annular ring assembly, and a rotating seal runner 30 connected to one of the rotating engine shafts of the gas turbine engine 10 (such as the shaft 11 in this example) and rotatable relative to the ring segments 22. In this embodiment, the ring segments 22 are arcuate carbon segments circumferentially arranged within the seal housing 24, the housing 24 being, in turn, fastened in fixed position to a supporting engine support and/or casing segment which will be generally referred to herein as a case 25. Further, as seen in FIG. 2, the ring segments 22 may include a pair of axially spaced segmented annular ring assemblies.

Referring still to FIG. 2, the seal and bearing assembly can be seen to include a radially bearing inner ring 62 and a radially bearing outer ring 64 which cooperate in receiving roller bearings 66 therein during use. The radially bearing outer ring 64 is mounted to the engine case 25 and are thus made integral to the ring segments 22 whereas the radially-bearing inner ring 62 is mounted to the shaft 11 and rotates with the seal runner 30. The radially-bearing outer ring 64 is axially spaced apart from the contact seal 20 and a bearing cavity 67 extends therebetween. The bearing cavity 67 leads to a radially external scavenge window 68 in the case 25.

Referring still to FIG. 2, the annular seal runner 30 is located adjacent to and radially inwardly from the ring segments 22 to thereby create a rotating contact interface between the ring segments 22 and the rotating seal runner 30, to form a substantially fluid tight seal therebetween when the engine shaft 11 rotates during operation of the engine 10. More particularly, a portion 92 of the radially-outer surface 32 of the seal runner 30, which can be referred to as a contacting portion 92 or ring-segment-receiving portion, contacts the radially-inner surfaces 23 of the ring segments 22. As will be seen, the seal runner 30 is internally cooled, in that the radially-outer surface 32 of the seal runner does not require external spray cooling but rather is cooled from within by circulating the cooling fluid (such as, but not necessarily, oil) internally within the cooling fluid passage 40 formed within the seal runner 30, and more specifically against a radially-inner surface 33 which is radially-opposite to the radially-outer surface 32 which receives the heat, and more specifically extends along the axial coordinates of the contacting portion 92. The cooling fluid is distributed to the seal runner via one or more non-rotating cooling fluid nozzles 21 and the configuration of the seal and bearing assembly is designed for the cooling fluid to be carried, given centripetal acceleration in the context of the rotating components forming the cooling fluid passage, along a given passage and to and along the cooling fluid passage 40 formed in the seal runner 30.

Figure 3:
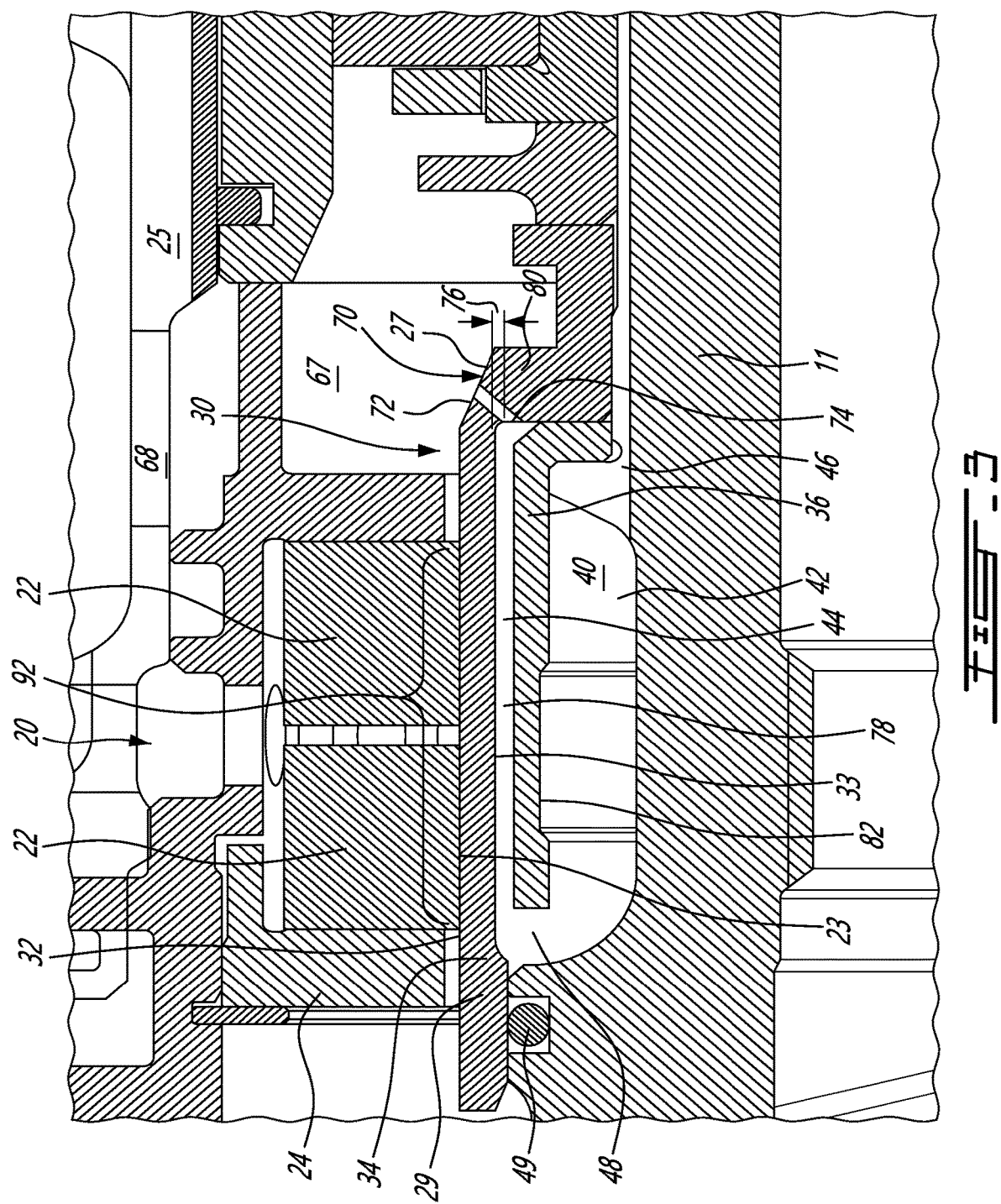
FIG. 3 is an enlarged portion of FIG. 2 showing a contact seal assembly with an internally cooled seal runner in greater detail.
Figure 4:
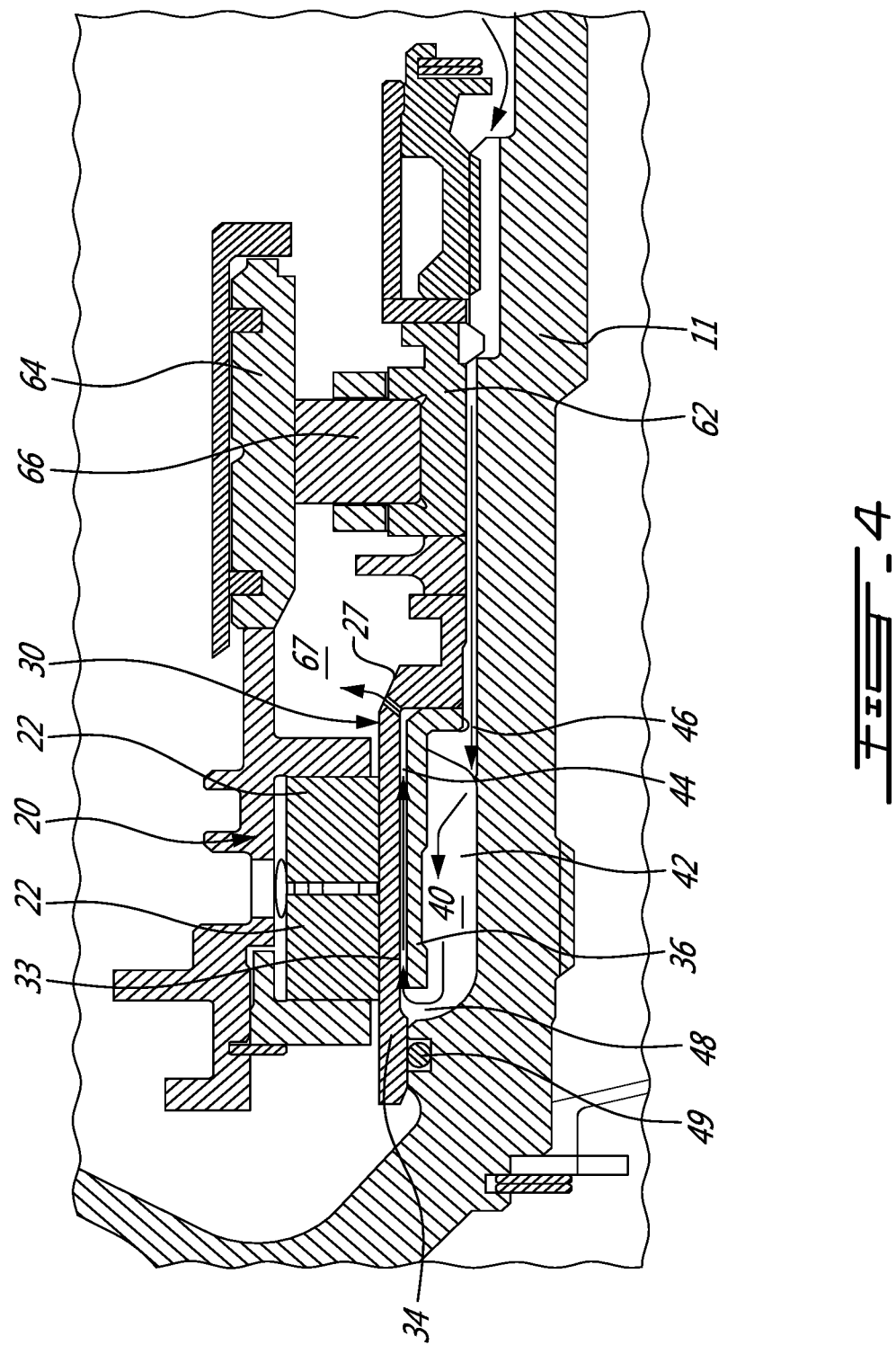
FIG. 4 is another partial cross-sectional view of a bearing and seal assembly showing the cooling fluid flow configuration.

As perhaps best seen in FIG. 3, in this specific embodiment, the seal runner 30 comprises a first and a second annular portions which will be referred to herein as the runner portion 34 and the sleeve portion 36 for ease of reference. The runner portion 34 and the sleeve portion 36 are concentric with one another, axially elongated and at least partially axially overlapping, and radially spaced apart from one another in a manner that the radial spacing between the sleeve portion 36 and the runner portion 34 forms a returning segment 44 of the cooling fluid passage 40 (e.g. returning toward the bearing). Moreover, in this embodiment, an enclosing portion of cooling fluid passage 40 is formed by the radially-outer surface of the shaft 11 which is also annular (hollow) and axially elongated, extending from a spray receiving inlet associated with the position of the nozzles 21, radially-inside the bearing and the seal runner 30 where it internally encloses the cooling fluid passage 40, and leading, in this particular embodiment, to a fan and boost attachment (an example general flow configuration of the cooling fluid being shown with arrows in FIG. 4 for ease of understanding). Accordingly, an outgoing segment of the cooling fluid passage can be said to be formed between the sleeve portion 36 and the shaft 11.

During use, cooling fluid enters the cooling fluid passage 40 via an inlet 46 located at a proximal end 27 of the seal runner 30. Centripetal acceleration combined with the designed shape of the runner components directs the cooling fluid in a manner to form a film which travels axially against a radially-inner surface of the sleeve portion 36 from the inlet 46 toward the distal end of the seal runner 30. A radial segment 48 of the cooling fluid passage 40 is provided at the distal end of the seal runner, bridging the outgoing segment 42 and the returning segment 44 of the cooling fluid passage 40. In this specific embodiment, the radial segment 48 is provided in the form of a gap extending between a distal edge of the sleeve portion 36 and an abutted joint between a distal end of the runner portion 34 and the shaft 11 and which is sealed with an O-ring member 49 trapped therebetween, however, in alternate embodiments, it will be understood that the radial segment 48 can be in the form of apertures formed in the sleeve portion, for instance. Cooling fluid travels in the radial segment 48 in a radially outward direction across radial thickness of the sleeve portion 36, and against a radially-inward face of the runner portion 34. Cooling fluid then travels back toward the bearing along the radially-inner surface 33 of the runner portion 34 and exits the cooling fluid passage 40 at the proximal end 27 of the seal runner 30 by an outlet 70 which can be in the form of a plurality of circumferentially interspaced apertures 72 across the proximal end 27 of the runner portion 34 or in the form of an annular aperture or of a plurality of circumferentially interspaced partially-annular (arcuate) apertures formed in the proximal end 27 of the runner portion 34, to name a few examples. The cooling fluid exiting the cooling fluid passage 40 in the seal runner 30 escapes to the bearing cavity 67 and through the scavenge window 68.

It will be noted in this embodiment that the one or more outlet apertures 72 across the runner portion 34 have an inlet end 74 and an outlet end, and that the inlet end 74 of the outlet apertures 72 is radially spaced-apart from the axially-extending internal surface 33 of the runner portion 34 which extends along the outer contact surface 32 of the runner portion 34 which contacts the ring segments 22 and which receives heat from the rubbing engagement therewith during use of the gas turbine engine. This radial spacing 76, also referred to herein as the 'given spacing distance 76', between the inlet end 72 of the outlet 70 and the radially-inner (cooling) surface 33 of the runner portion 34, forms an annular pocket 78 which has the given radial spacing 76 and in which an annular pool of cooling fluid having a corresponding depth can be received and be maintained during use, which can assist in optimizing the cooling action. Accordingly, during use, an annular pool of cooling fluid of a given depth is maintained in the annular pocket as 'new', or 'cold' cooling fluid enters the annular pool from the radial segment 48 at the distal end 29 and 'used' or 'hot' cooling fluid exits the annular pool from the outlet 70 at the proximal end 27. In this specific embodiment, the pool extends at least along the axial length of the contacting portion 92, opposite thereto, to directly evacuate the heat generated thereon by the rubbing.

More specifically, in this embodiment, the runner portion 34 has a radially-inward extending portion 80 adjacent to the radially-inner cooling surface 33, and the outlet 70 is provided in the form of at least one aperture 72 provided across the radially-inward extending portion 80.

Moreover, in this embodiment, the sleeve portion 36 of the seal runner 30 is formed with an annular recessed portion 82 on the radially-inner, cooling-fluid-guiding surface thereof, which is positioned near the distal end of the sleeve portion 36, and in which cooling fluid can accumulate and even out (uniformize) in a manner to then be distributed into the radially-outward segment 48 in a more circumferentially uniform film or flow than if the cooling fluid was not allowed to even out in the recessed portion 82. Accordingly, in this specific embodiment, the function of the recessed portion 82 in the sleeve portion, which can alternately be referred to herein as a 'gutter' for ease of reference, is to allow evening out of the flow of cooling fluid in the circumferential orientation by contrast with the function of the radial spacing 76 between the inlet end 74 of the outlet 70 and the radially-inner surface 33 of the runner portion 34 which is to form the annular pool of cooling fluid having a given depth immediately against the portion of the seal runner which is likely to be most exposed to heat during use.

It will be understood that in the embodiment shown in FIG. 2, the bearing and seal assembly shown is a bearing and seal assembly of a low pressure fan/boost stage, but it will be understood that the internally-cooled seal runner described herein can alternately be applied to a turbine stage, or to a high-pressure compressor stage, for instance. In alternate embodiments, the seal can be forward of the bearing or rearward of the bearing.

As noted above, at least one cooling fluid passage 40 is radially defined within the seal runner 30, into which cooling oil is fed to cool the seal runner 30 in general, and the runner portion 34 having the outer contact surface 32 thereon in particular. Accordingly, the cooling fluid passage 40 is internally formed within the seal runner 30 such that the seal runner 30 is cooled from within. Cooling oil within the cooling fluid passage 40 will be forced radially outward by centrifugal force, thereby ensuring that the cooling oil is maintained in contact with the inner surface of the runner portion 34, which defines the contact surface on the opposed radially-outer surface for rubbing against the ring segments 22. Thus, the underside of the runner surface is cooled internally, by absorbing the heat therefrom using the circulating oil flow. Further, the centrifugal force of the shaft rotating will also generate pumping of the cooling oil.

The seal runner 30 may be formed in a number of different manners, and may comprise one, two or more separate components which together form the seal runner 30. For example, in one embodiment the seal runner 30 may be formed using a three-dimensional printing production technique, whereby the seal runner 30 is integrally formed of a single piece (i.e. is monolithic). In another possible embodiment of the present disclosure, the seal runner 30 is composed of two or more portions, which are separately formed and engaged or otherwise assembled together to form the finished seal runner 30. Although welds may be used to engage the components of the seal runner 30 together, other suitable engagements means may also be used, such as for example only, brazing, bonding, adhering, fastening, trapping abutment, etc.

Figure 5:
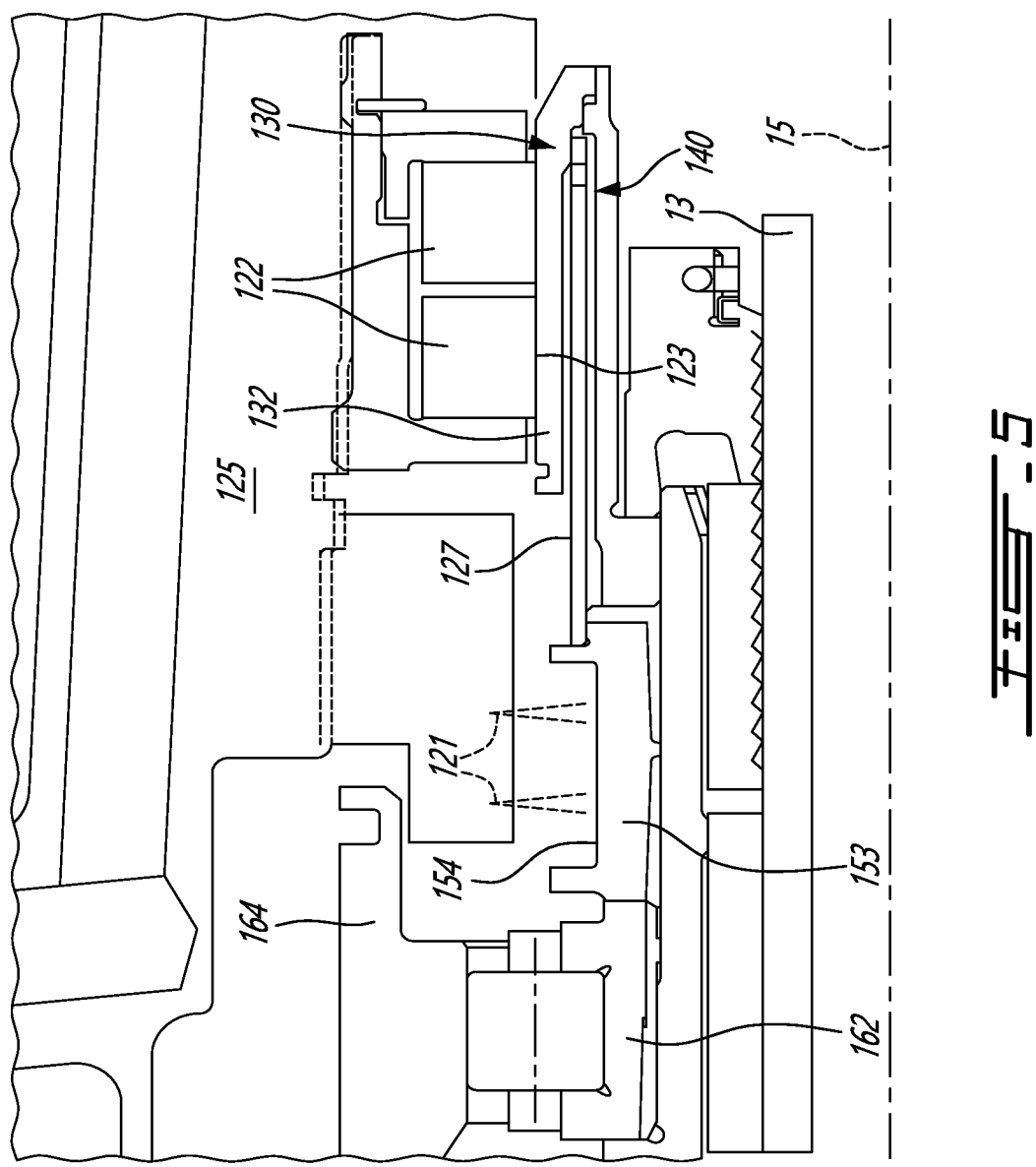
FIG. 5 is a schematic cross-sectional view of another embodiment of a contact seal assembly.

Referring to FIG. 5, another embodiment of an annular seal runner 130 is shown. The annular seal runner 130 is located adjacent to and radially inwardly from the ring segments 122 to thereby create a rotating contact interface between the ring segments 122 and the rotating seal runner 130, to form a substantially fluid tight seal therebetween when the engine shaft 13 rotates during operation of the engine 10. More particularly, a radially-outer surface 132 of the seal runner 130 contacts the radially-inner surfaces 123 of the ring segments 122. As will be seen, the seal runner 130 is internally cooled, in that the radially-outer contact surface 132 of the seal runner does not require external spray cooling but rather is cooled from within by circulating the cooling fluid (such as, but not necessarily, oil) internally within the cooling fluid passage 140 formed within the seal runner 130. The cooling oil is distributed to the seal runner via one or more cooling fluid nozzles 121 which feed the cooling oil radially inwardly onto the circumferentially extending open topped channel 154 disposed at a proximal end 127 of the seal runner 130. Moreover, radially-bearing inner ring 162 and a radially-bearing outer ring 164 which cooperate in receiving roller bearings 166 therein during use. The radially-bearing outer ring 164 is mounted to the engine case 125 with the ring segments 122 whereas the radially-bearing inner ring 162 is mounted to the shaft 13 with the seal runner 130 and an annular scoop member 153.

For instance, an embodiment such as shown in FIG. 5 can have incorporated therein either one of the feature of the pool of cooling liquid having a given depth on the radially-inner surface of the runner portion and the feature of the gutter on the radially-inner surface of the sleeve portion to uniformize the flow of cooling liquid across the radial segment of the cooling fluid passage.

When used in a gas turbine engine 10 such as that depicted in FIG. 1, the present seal runner may be used about any rotating shaft or other element thereof, such as for example about at least one of the main engine shafts 11 and 13. Alternately, the seal runner may be employed to seal another rotating shaft in the gas turbine engine 10 or in another turbomachine, pump, compressor, turbocharger or the like. The seal runner 30 may be mounted to the shaft using any suitable means such that it rotates within the ring segments 22 and remains in contact therewith when the shaft rotates. Thus, the contact seal provides a fluid seal about the rotating shaft. Moreover, it will be understood that the seal and bearing assembly can be suitable for use in other gas turbine engines than turbofan engines, such as turboprop or turboshaft engines to name other examples.

The above description is meant to be exemplary only, and one skilled in the art will recognize that changes may be made to the embodiments described without departing from the scope of the invention disclosed. Moreover, in alternate embodiments, the cooling fluid passage can be in the form of a continuous annular passage around the rotation axis of the shaft, or provided in the form of a plurality of arcuate passage portions interspaced circumferentially from one another around the shaft. Still other modifications which fall within the scope of the present invention will be apparent to those skilled in the art, in light of a review of this disclosure, and such modifications are intended to fall within the appended claims.

The invention claimed is:

1. A seal runner for use in a contact seal assembly of a gas turbine engine, the seal runner comprising an annular body configured to be secured to a rotating shaft of the gas turbine engine, the seal runner having a radially-outer surface defining a contacting portion configured for abutting against ring segments of the contact seal assembly that are securable to a case of the gas turbine engine, the seal runner having a radially-inner surface extending axially, the seal runner having a cooling fluid passage having a segment extending along the radially-inner surface of the seal runner and leading axially to an outlet being at least one aperture extending through the annular body, the outlet having an inlet end fluidly connected to the cooling fluid passage, the inlet end being located radially inwardly of the radially-inner surface of the seal runner by a given spacing distance in a manner to form a pocket for receiving cooling fluid, the pocket being annular and extending completely circumferentially around a centerline axis of the seal runner, the pocket having a depth corresponding to the given spacing distance and extending radially inwardly from the radially-inner surface of the seal runner, the pocket extending under the contacting portion and axially overlapping a majority of the contacting portion configured to be contacted by the sealing ring.

2. The seal runner of claim 1, wherein the annular body has a runner portion being annular and defining the radially-outer surface and the radially-inner surface, the runner portion having a radially-inward extending portion adjacent to the radially-inner surface, and wherein the at least one aperture extends across the radially-inward extending portion, the at least one aperture extending radially-outwardly from the inlet end.

3. The seal runner of claim 2, wherein the radially-inner surface and the radially-inward extending portion both extend annularly, and the outlet is provided in the form of a plurality of circumferentially-interspaced outlet apertures each having a corresponding inlet end.

4. The seal runner of claim 1, wherein the annular body has a runner portion being annular and defining the radially-outer surface and the radially-inner surface, the annular body further including a sleeve portion made integral to the runner portion, the sleeve portion extending annularly, concentric to, and radially-inward of the runner portion, along at least a portion of an axial length of the radially-inner surface of the runner portion.

5. The seal runner of claim 4, wherein the segment extending along the radially-inner surface is a returning segment, the sleeve portion is configured to be concentric to, and disposed radially-outward of the shaft, the sleeve portion configured for forming a radial spacing between the sleeve portion and the shaft, an outgoing segment of the cooling fluid passage extending along a radially-inner surface of the sleeve portion and leading to a distal end of the sleeve portion, the seal runner further comprising a radial segment of the cooling fluid passage bridging the outgoing segment of the cooling fluid passage and the returning segment of the cooling fluid passage at the distal end of the sleeve portion.

6. The seal runner of claim 5, wherein the sleeve portion has an annular recess formed in the radially-inner surface of the sleeve portion, the annular recess adjacent the distal end, for allowing circumferential uniformization of the cooling fluid circulating within the radial segment.

7. The seal runner of claim 1, wherein the seal runner has an annular abutment portion located axially opposite to the outlet and having a radially-inward face configured and adapted for abutment against an O-ring.

8. The seal runner of claim 1, wherein the seal runner and the shaft have complementary annular abutment portions located axially opposite to the outlet of the seal runner, the seal runner further comprising an O-ring trapped between the complementary annular abutment portions of the seal runner and the shaft.

9. A gas turbine engine comprising a contact seal assembly having a seal runner having an annular body secured to a rotating shaft of the gas turbine engine, the seal runner having a radially-outer surface defining a contacting portion abutting against ring segments of the contact seal assembly that are secured to a case of the gas turbine engine, the seal runner having a radially-inner surface extending axially, the seal runner having a cooling fluid passage having a segment extending along the radially-inner surface of the seal runner and leading axially to an outlet being at least one aperture extending through the annular body, the outlet having an inlet end fluidly connected to the cooling fluid passage, the inlet end being located radially inwardly of the radially-inner surface of the seal runner by a given spacing distance in a manner to form a pocket for receiving cooling fluid, the pocket being annular and extending completely circumferentially around a centerline axis of the seal runner, the pocket having a depth corresponding to the given spacing distance and extending radially inwardly from the radially-inner surface of the seal runner, the pocket axially overlapping at least a portion of the ring segments.

10. The seal runner of claim 9, wherein the annular body has a runner portion being annular and defining the opposite radially-outer surface and the radially-inner surface, the runner portion having a radially-inward extending portion adjacent to the radially-inner surface, and wherein the at least one aperture extends across the radially-inward extending portion, the at least one aperture extending radially-outwardly from the inlet end.

11. The seal runner of claim 10, wherein the radially-inner surface and the radially-inward extending portion both extend annularly, and the outlet is provided in the form of a plurality of circumferentially-interspaced outlet apertures each having a corresponding inlet end.

12. The seal runner of claim 9, wherein the annular body has a runner portion being annular and defining the radially-outer surface and the radially-inner surface, the annular body further including a sleeve portion made integral to the runner portion, the sleeve portion extending annularly, concentric to, and radially-inward of the runner portion, along at least a portion of an axial length of the radially-inner surface of the runner portion.

13. The seal runner of claim 12, wherein the segment extending along the radially-inner surface is a returning segment, wherein the sleeve portion is further concentric to, and radially-outward of the shaft, the sleeve portion forming a radial spacing between the sleeve portion and the shaft, an outgoing segment of the cooling fluid passage extending along a radially-inner surface of the sleeve portion and leading to a distal end of the sleeve portion, the seal runner further comprising a radial segment of the cooling fluid passage bridging the outgoing segment of the cooling fluid passage and the returning segment of the cooling fluid passage at the distal end of the sleeve portion.

14. The seal runner of claim 13, wherein the sleeve portion has an annular recess formed in the radially-inner surface of the sleeve portion, the annular recess adjacent the distal end, for allowing circumferential uniformization of the cooling fluid circulating within the radial segment.

* * * * *